Figure 3:
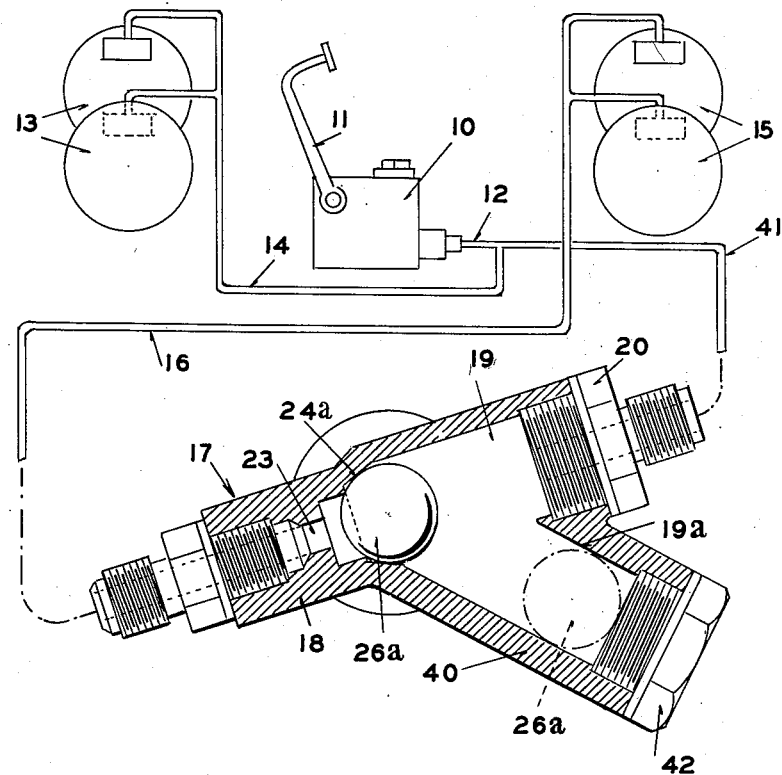

Dec. 5, 1939.  J. P. BEESTON  2,182,463
LIQUID PRESSURE BRAKING SYSTEM FOR VEHICLES
Filed Feb. 27, 1939   2 Sheets-Sheet 1
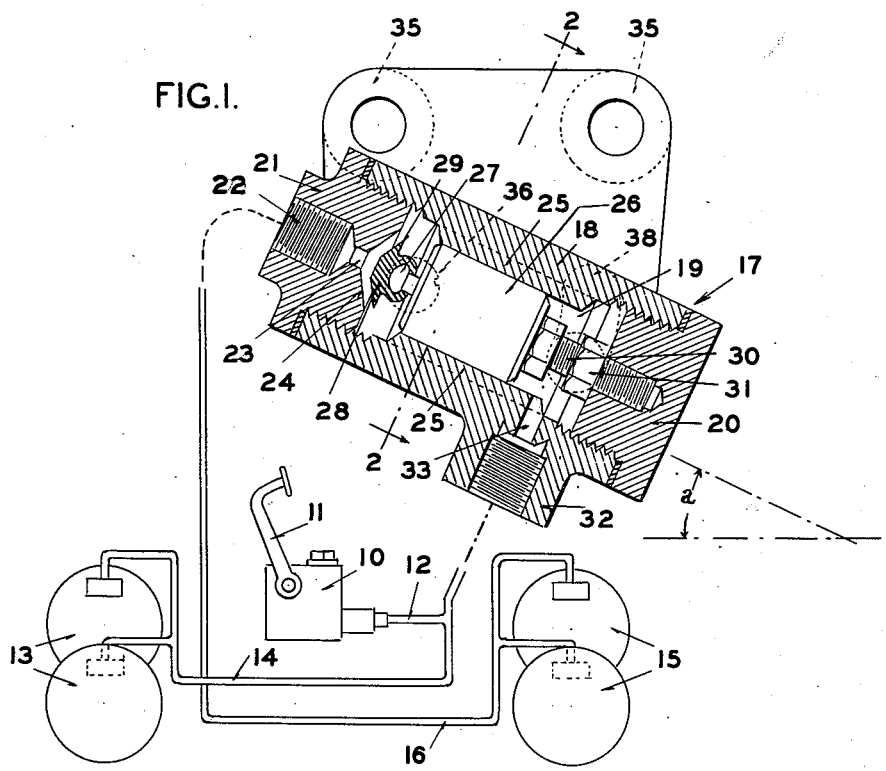
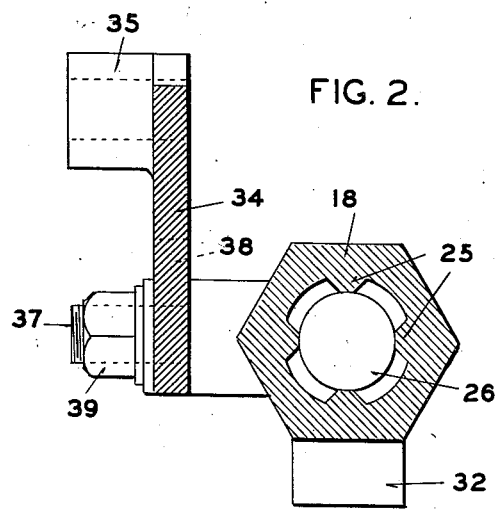
INVENTOR
J. P. BEESTON
ATTORNEY Patented Dec. 5, 1939

2,182,463

UNITED STATES PATENT OFFICE 2,182,463

LIQUID PRESSURE BRAKING SYSTEM FOR VEHICLES

John Percival Beeston, London, England, assignor to Automotive Products Company Limited, London, England, a British company Application February 27, 1939, Serial No. 258,663
In Great Britain February 24, 1938

6 Claims. (Cl. 188—152)

This invention relates to liquid pressure braking systems for vehicles, and it has for its object to provide an improved construction of system in which the braking effect on the rear wheels of a vehicle is automatically limited during strong brake applications, primarily for the purpose of accentuating the retarding effect of the front wheel brakes and to prevent skidding.

The invention further seeks to provide an improved and simplified form of fitting which can readily be incorporated in existing hydraulic brake systems for the purpose of bringing about this desirable limiting effect upon the power of the rear brakes.

According to the invention there is provided in a liquid pressure vehicle braking system a valve device which is responsive to deceleration of the vehicle during braking, and which automatically cuts off or controls the supply of pressure liquid to the rear wheel brakes when the rate of deceleration reaches a predetermined value. Thus, in a liquid pressure vehicle braking system comprising a master cylinder unit and hydraulic brakes acting on the rear wheels of the vehicle, the present invention consists in the provision of a momentum-actuated valve arranged to isolate the rear wheel brakes from the master cylinder unit when the rate of deceleration reaches a predetermined value.

Further, in a liquid pressure vehicle braking system comprising a master cylinder unit and hydraulic brakes acting upon the rear wheels of the vehicle, there is provided according to the invention a momentum-actuated valve which is interposed between the master unit and the rear wheel brakes, and which has a weight arranged to move forwardly along a path inclined upwardly with respect to the road surface, so as to isolate the rear wheel brakes from the master unit when the weight moves to the forward end of said path. Preferably the momentum-actuated valve comprises a housing having adjacent its rear end a connection to the master unit, and at its front end a passageway leading to the rear wheel brakes, said housing containing a valve member which slides forwardly along an upwardly inclined path when the vehicle is decelerated, and closes the front passageway, a resilient seating of rubber or the like conveniently being provided between the passageway and the valve member to secure a pressure-tight closure. If desired, the resilient seating may be secured to and carried by the valve member itself. To facilitate the adjustment of the inclination of the housing the latter may be mounted upon the vehicle by means of an intermediate member, a slotted connection being provided to give a range of angular adjustment. The valve member in the preferred construction comprises a cylindrical block which slides upon longitudinal ribs formed within the housing, and which carries at its front end an axial projection fitted with a rubber cap adapted to close the passageway at the front end of the housing when the valve is in its most forward position, the range of travel of said valve member conveniently being readily adjustable by means of a limiting stop provided at the rear end of said housing. Alternatively, the valve member may be in the form of a ball which is free to roll along an inclined track within the housing so as to close a passageway at the front end of said housing when the momentum of the ball enables it to roll to the forward end of the housing during deceleration of the vehicle.

Two examples of the present invention are illustrated in the accompanying drawings in which Figure 1 is a sectional elevation showing details of the valve device, the remaining components of the vehicle braking system being shown diagrammatically to a reduced scale; Figure 2 is a sectional elevation taken on the line 2—2 of Figure 1; and Figure 3 is a sectional elevation of a modified construction of valve device, the remainder of the braking system again being shown diagrammatically to a reduced scale.

The system illustrated in Figure 1 comprises a combined reservoir and master cylinder unit 10 having a brake pedal 11, movement of which causes liquid under pressure to be delivered through a pipe 12 to a pair of front wheel brakes indicated at 13 through a pipe line 14 and also to a pair of rear wheel brakes 15 fed through a pipe line 16. The pipe line 14 is connected directly with the outlet 12 from the master cylinder unit but a valve device indicated generally at 17 is interposed between said outlet 12 and the pipe line 16 feeding the rear brakes 15.

The valve device 17 shown in Figures 1 and 2 comprises a housing 18 which is formed with a longitudinal passageway 19, the rear end of the latter being completely closed by a screw-threaded plug 20, while the front end is fitted with a plug 21 internally screw-threaded at 22 to receive a connection for the pipe line 16. A passageway 23 through the plug 21 terminates in a frusto-conical seating 24. At the middle part of its length the passageway 19 has a plurality of inwardly directed ribs 25 along which a cylindrical valve member 26 is freely slidable. At its forward end the valve member is formed with an undercut projection 27 arranged to fit within a correspondingly shaped recess in a cap 28 composed of rubber or like relatively soft resilient material. It will be seen that the forward end of the cap 28 is frusto-conical to mate with the seating 24, and it is moreover formed at its periphery with a lip 29 adapted to be easily pressed against the plug 21 by the action of liquid pressure within the passageway 19. Rearward movement of the valve member 26 is limited by an adjustable stop comprising a bolt 30 which is screw-threaded into the plug 20 and is locked in position by a nut 31. A lateral boss 32 formed with a passageway 33 leading into the passageway 19 enables pressure liquid from the master cylinder 10 to communicate at all times with the interior of the housing 18.

The valve device 17 is fitted to a vehicle so that the plug 21 is directed forwardly and the plug 20 rearwardly, but the housing 18 is inclined upwardly at its front end so that with the vehicle standing on a level road the valve member 26 always slides rearwards into engagement with the stop 30. This angle of inclination is indicated at $a$ in Figure 1. During slight and medium braking of the motor vehicle the valve member 26 remains in this position, so that pressure liquid from the master cylinder unit 10 passes freely between the ribs 25 and gains access to the passageway 23 leading to the rear brakes 15, thus operating the latter simultaneously with the front brakes 13. Should the brakes be applied heavily, or should other conditions arise which bring about an excessive deceleration of the vehicle, the momentum of the valve member 26 causes said valve member to move forwardly relative to the housing 18, the rubber cap 28 closing the passageway 23. This isolates the rear brakes 15 from the master cylinder unit 10, and although said rear brakes continue to act in a limited capacity, the extent to which they are applied cannot be increased by any rise of pressure in the master cylinder unit 10, such rise in pressure being communicated solely to the front brakes 13. By this means premature skidding of the rear brakes is prevented and the maximum useful effect is obtained from the front brakes 13 with a relatively small operating movement of the pedal 11. When the vehicle is descending a hill the inclination of the housing 18 with respect to the level is somewhat diminished, but this is advantageous in view of the fact that the inclination of the vehicle as a whole causes a greater proportion of the weight to be placed on the front wheels, so reducing the effective braking capacity of the rear wheels. When travelling uphill the opposite effect is produced, a greater deceleration being required to put the rear brakes out of communication with the master cylinder unit. Again this is desirable, as under these conditions the rear wheels are supporting an increased proportion of the weight and consequently are capable of exerting an increased braking force without skidding.

In order to enable the inclination $a$ of the valve device 17 to suit various vehicles, road surfaces and other conditions, the housing 18 is mounted upon the vehicle by means of an intermediate member 34 in the form of a plate having bosses 35 for attachment to the chassis or any other convenient part of the vehicle. At its lower part the plate 34 has a hole 36 for the reception of a stud upon the housing 18, while a similar stud 37 passes through an arcuate slot 38, the angular setting of the housing 18 being locked by means of a nut 39.

Figure 3 shows a similar form of system except that the valve device 17 is modified in construction. It comprises a housing 18 which is of bifurcated or Y-shape, an oblique limb 40 having a bore 19a being arranged to form the path for a valve member 26a in the form of a metal ball. As before, the front end of the housing 18 is formed with a passageway 23 communicating by a pipe line 16 with the rear brakes 15, while the passageway 19 has a plug 20 through which pressure liquid is fed by means of a connection 41 leading to the delivery pipe 12 of the master cylinder unit 10. At its forward end the passageway 19 is formed with a frusto-conical seating 24a which is adapted to be entirely closed by the ball 26a when the latter is in the position shown in full lines, i. e. during excessive deceleration of the vehicle. Under normal conditions the ball 26a rolls rearwards to the lower end of the bore 19a and comes to rest against a closure plug 42.

It is, of course, important that the device according to the invention shall be mounted upon the vehicle at an appropriate angle to the horizontal surface, further increase of pressure in the deceleration at which further application of the rear brakes is prevented. For example, when the ball or equivalent mass has to roll up a slope of 20° when the vehicle is running along a horizontal surface, further increase of pressure in the rear brakes will automatically be prevented when the deceleration of the vehicle exceeds approximately 11 feet per second, while an inclination of 10° similarly gives the desired result at a deceleration of approximately 5.6 feet per second.

It will be understood that the constructions described are given merely as examples and that various modifications can be made in the valve device without departing from the invention.

Having fully described my invention, what I claim as new and desire to secure by Letters Patent of the United States is:

1. In a motor vehicle provided with a plurality of brakes and fluid pressure means for applying the brakes and comprising conduit means for conducting fluid, valve means for closing the conduit means associated with certain of said brakes, said means comprising a rolling ball normally maintained by the action of gravity in a position causing said valve means to be open but moved by the action of inertia when the vehicle is decelerating at a predetermined rate to a position causing said valve means to be closed.

2. In fluid pressure braking apparatus for a vehicle, a plurality of sets of brakes, means for actuating the brakes and comprising a source of pressure, a fluid motor associated with each brake and conduit means for connecting said motors to the source of pressure, normally open valve means associated with the conduit means leading to the fluid motors of one set of brakes, and momentum-actuated means automatically operating to close said valve means when the rate of deceleration of the vehicle reaches a predetermined value, said valve means when closed maintaining the existing fluid pressure in the fluid motors of said set of brakes and preventing additional pressure to be applied thereto.

3. In fluid pressure braking apparatus for a vehicle, front and rear brakes, means for actuating the brakes and comprising a source of pressure, a fluid motor associated with each brake and conduit means for connecting said motors to the source of pressure, normally open valve means associated with the conduit means leading to the fluid motors of the rear brakes, and momentum-actuated means automatically operating to close said valve means when the rate of deceleration of the vehicle reaches a predetermined value, said valve means when closed maintaining the existing fluid pressure in the fluid motors of the rear brakes and preventing additional pressure to be applied thereto.

4. In fluid pressure braking apparatus for a vehicle, a plurality of sets of brakes, means for actuating the brakes and comprising a source of pressure, a fluid motor associated with each brake and conduit means for connecting said motors to the source of pressure, and valve means associated with the conduit means leading to the fluid motors of one set of brakes, said valve means comprising a member normally maintained in valve open position by the action of gravity but moved to a valve closed position by the action of inertia during deceleration of the vehicle at a predetermined rate, said valve when closed maintaining the existing fluid pressure in the fluid motors of said one set of brakes and preventing additional pressure to be applied thereto.

5. In fluid pressure braking apparatus for a vehicle, a plurality of sets of brakes, means for actuating the brakes and comprising a source of pressure, a fluid motor associated with each brake and conduit means for connecting said motors to the source of pressure, and valve means associated with the conduit means leading to the fluid motors of one set of brakes, said valve means comprising an element mounted to move on a track having a predetermined inclination with respect to a horizontal roadway, and said element being normally maintained in valve open position by action of gravity but impelled to valve closed position by the action of inertia when the deceleration of the vehicle is at a predetermined rate.

6. In fluid braking apparatus for a vehicle, front and rear brakes, a fluid motor for each of the brakes, a master cylinder, conduit means for connecting the master cylinder to the front brakes, conduit means for connecting the master cylinder to the rear brakes, a valve containing housing forming part of one of said conduit means and embodying a track inclined upwardly when the vehicle is on a horizontal roadway, a valve element movable upwardly on said track to valve closing position by influence of inertia when the rate of deceleration of the vehicle reaches a predetermined value, said valve when closed preventing transfer of fluid from the master cylinder side of the valve to the fluid motor side thereof and also maintaining the fluid pressure in the fluid motor side existing at the time the valve closes.

JOHN PERCIVAL BEESTON.